United States Patent
Carpenter et al.

(10) Patent No.: US 12,469,096 B2
(45) Date of Patent: Nov. 11, 2025

(54) IN-VEHICLE BIOMETRIC COLLECTION AND VERIFICATION

(71) Applicant: SECURIPORT LLC, Washington, DC (US)

(72) Inventors: Nathan Thomas Carpenter, Washington, DC (US); Roberto Leandro Olie, Washington, DC (US); Marcelo Motta, Washington, DC (US); Enrique Segura, Washington, DC (US)

(73) Assignee: Securiport LLC, Reston, VA (US)

( * ) Notice: Subject to any disclaimer, the term of this patent is extended or adjusted under 35 U.S.C. 154(b) by 360 days.

(21) Appl. No.: 17/132,753

(22) Filed: Dec. 23, 2020

(65) Prior Publication Data

US 2021/0192658 A1    Jun. 24, 2021

Related U.S. Application Data (60) Provisional application No. 62/953,200, filed on Dec. 23, 2019.

(51) Int. Cl.
*G06Q 10/10*    (2023.01)
*G06K 7/10*    (2006.01)
(Continued)

(52) U.S. Cl.
CPC ....... *G06Q 50/265* (2013.01); *G06K 7/10366* (2013.01); *G06V 40/10* (2022.01);
(Continued)

(58) Field of Classification Search
CPC .. G06Q 50/265; G06K 7/10366; G06V 40/10; G06V 30/40; G06V 40/13;
(Continued)

(56) References Cited

U.S. PATENT DOCUMENTS 6,018,739 A  *  1/2000  McCoy ................... G06V 40/16
                                                 707/999.102
6,317,544 B1 * 11/2001  Diehl ...................... G06F 21/32
                                                      385/115
(Continued)

FOREIGN PATENT DOCUMENTS

RS        20 120 407 A1    4/2014

OTHER PUBLICATIONS

International Search Report mailed Apr. 7, 2021 for corresponding application No. PCT/IB2020/062419.
(Continued)

*Primary Examiner* — Jonathan P Ouellette
(74) *Attorney, Agent, or Firm* — MILES & STOCKBRIDGE P.C.

(57) ABSTRACT

Within a vehicle, and at a border crossing, a verification device enables unsupervised or automatic biometric authentication of subjects (i.e., persons or travelers) moving between secured areas (e.g., across a border or into a secured facility, for example). Verification device is configured to store reference biometric information for one or more vehicle occupants. Upon approaching a verification station at a border crossing, user(s) supply one or more biometrics (e.g., fingerprint, facial recognition, voice recognition) for validation against the reference biometric information. Upon validation, verification device transmits a validated signal to the verification station to enable the vehicle to pass the border crossing without stopping at the immigration booth. For example, the receipt of a validated signal may trigger the opening of a gate at a border crossing. If verification device cannot validate the user's biometric against the reference biometric information, the verification device may transmit a not-validated signal to the verification station, and the user proceeds to stop at the immigration booth.

20 Claims, 5 Drawing Sheets

(51) Int. Cl.
*G06Q 40/08* (2012.01)
*G06Q 50/26* (2012.01)
*G06V 40/10* (2022.01)
*G06V 30/40* (2022.01)
*G06V 40/12* (2022.01)
*G06V 40/13* (2022.01)
*G06V 40/16* (2022.01)
*G10L 17/06* (2013.01)

(52) U.S. Cl.
CPC .............. *G06V 30/40* (2022.01); *G06V 40/13* (2022.01); *G06V 40/1365* (2022.01); *G06V 40/172* (2022.01); *G10L 17/06* (2013.01)

(58) Field of Classification Search
CPC .. G06V 40/1365; G06V 40/172; G10L 17/06; G07C 9/257
USPC .................................................... 705/1.1, 325
See application file for complete search history.

(56) References Cited

U.S. PATENT DOCUMENTS

| | | | | |
|---|---|---|---|---|
| 7,505,610 | B2* | 3/2009 | Milne | H04N 1/32101 |
| | | | | 382/116 |
| 7,693,313 | B2* | 4/2010 | Ehlers | G06K 19/0723 |
| | | | | 382/128 |
| 7,735,725 | B1* | 6/2010 | Bishop | G06Q 20/20 |
| | | | | 340/5.9 |
| 7,969,280 | B2* | 6/2011 | Slevin | G07C 9/00182 |
| | | | | 340/5.31 |
| 8,232,862 | B2* | 7/2012 | Lowe | G06K 19/0723 |
| | | | | 340/5.53 |
| 8,665,062 | B2* | 3/2014 | Bragagnini | G07C 9/38 |
| | | | | 235/382 |
| 10,810,816 | B1* | 10/2020 | Kocher | H04L 63/0853 |
| 2005/0055582 | A1* | 3/2005 | Bazakos | G06F 21/35 |
| | | | | 726/19 |
| 2005/0110610 | A1* | 5/2005 | Bazakos | G08G 1/207 |
| | | | | 340/5.82 |
| 2005/0207624 | A1* | 9/2005 | Ehlers | G06K 19/0723 |
| | | | | 340/5.6 |
| 2008/0147246 | A1 | 6/2008 | Cochran et al. | |
| 2008/0224823 | A1* | 9/2008 | Lawson | G06F 21/34 |
| | | | | 340/5.8 |
| 2012/0042369 | A1* | 2/2012 | Fan | G07C 9/257 |
| | | | | 726/19 |
| 2012/0075442 | A1* | 3/2012 | Vujic | G07C 9/257 |
| | | | | 235/472.01 |
| 2014/0077927 | A1 | 3/2014 | Mattern | |
| 2015/0143511 | A1* | 5/2015 | Vujic | G06F 21/32 |
| | | | | 726/19 |
| 2016/0300414 | A1 | 10/2016 | Lambert et al. | |
| 2017/0077927 | A1* | 3/2017 | Lee | H03K 19/0005 |
| 2017/0103265 | A1 | 4/2017 | Channah et al. | |
| 2017/0317997 | A1* | 11/2017 | Smith | G06Q 20/3829 |

OTHER PUBLICATIONS

Written Opinion mailed Apr. 7, 2021 for corresponding application No. PCT/IB2020/062419.
Extended European Search Report and Search Opinion issued Dec. 6, 2023 in corresponding European Application No. 20904500.4.

* cited by examiner

IN-VEHICLE BIOMETRIC COLLECTION AND VERIFICATION

PRIORITY APPLICATION

This application claims the benefits of U.S. Provisional Patent Application No. 62/953,200, filed on Dec. 23, 2019, which is incorporated herein by reference in its entirety.

FIELD OF THE INVENTION

The embodiments of the present invention generally relate to improved systems and methods for identifying people, and in particular, to improved systems and methods for in-vehicle biometric collection and verification.

DISCUSSION OF THE RELATED ART

In places where people make frequent trips across borders, especially across land borders, the regulations of the country may require the collection of biometric data from the travelers. For frequent travelers, this information is unlikely to change from trip-to-trip and is likely to be burdensome and time-consuming to collect at each border crossing or for each trip. For land-based travelers in vehicles (e.g., cars, vans, motorcycles, etc.), where the authorities are required to collect biometrics, the travelers exit the vehicle to an immigration booth, or the officer moves to the vehicle to identify the traveler. Both scenarios are burdensome and further may pose a safety and/or security issue for the travelers and officer.

In addition, the collection of biometrics is best performed in a controlled environment where the lighting, temperature, moisture, and biometric collection device installation may be controlled, and where the process may be done under supervision. This is very difficult to do in a vehicle and is usually done at a properly configured booth staffed by an officer (such as at immigration, for example). Use of such booths is not only time consuming, but the booths themselves are also quite expensive.

Accordingly, the inventors of the embodiments described herein have developed systems and methods to verify the biometrics of travelers in an accurate and secure way without requiring the travelers to move out of or exit their vehicle or the officer to move out of their booth, and to do so in a rapid, safe, efficient, and cost-effective manner.

SUMMARY OF THE INVENTION

Accordingly, the embodiments of the present invention are directed to in-vehicle biometric collection and verification systems and methods that substantially obviate one or more problems due to limitations and disadvantages of the related art.

Additional features and advantages of the invention will be set forth in the description that follows, and in part will be apparent from the description, or may be learned by practice of the invention. The objectives and other advantages of the invention will be realized and attained by the structure described herein.

To achieve these and other advantages and in accordance with the purpose of the present invention, as embodied and broadly described, the in-vehicle biometric collection and verification systems and methods include components and/or steps for receiving, at an RFID reader of a registration station, a device identifier, receiving, at a document scanner of the registration station, document data for an identifying document, receiving, at a biometric scanner of the registration station, biometric data of a user, receiving, at the registration station, identifying data of a vehicle, associating, at the registration station, the document data and the biometric data with the device identifier, and transmitting the associated data to the verification device and to a registration server.

The in-vehicle biometric collection and verification systems and methods further include components and/or steps for receiving, at RFID reader, a validated or not-validated signal from verification device, if a validated signal is received, instructing that a pass signal is transmitted to an access control device to enable a vehicle to pass a border crossing without stopping at an immigration booth, if a not-validated signal is received, instructing that a no-pass signal is transmitted to the access control device such that the vehicle is directed to the immigration booth.

The in-vehicle biometric collection and verification systems and methods further include components and/or steps for receiving, at a biometric scanner, biometric data for a user, comparing, at a processor, the biometric data against reference biometric data, if the biometric data matches the reference biometric data, generating a validated signal, and if the biometric data does not match the reference biometric signal, generating a not-validated signal, and transmitting, at an RFID transponder, the validated signal or the not-validated signal to a verification station.

It is to be understood that both the foregoing general description and the following detailed description are examples intended to provide further explanation of the embodiments of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the example embodiments of the present invention.

Embodiments of user interfaces and associated methods for using a device are described. In some embodiments, the device is a portable communication device (e.g., a mobile phone or tablet). The user interface may include a touch screen, a gyroscopic or other acceleration device, a fingerprint scanner for fingerprint collection, a camera configured for facial biometric collection, a microphone configured for voice biometric collection, and/or other input/output and biometric devices. In the discussion that follows, a portable communications device is used as an example embodiment. It should be understood, however, that the user interfaces and associated methods may be applied to other devices, such as a windshield-mounted tag for single-occupant vehicles, as a smart card, or as a tag mounted on a vehicle license plate coupled with an in-vehicle device.

The portable communication device may support a variety of applications, such as wired or wireless communications. The various applications that may be executed on the device may use at least one common physical user-interface device, such as a touchscreen. One or more functions of the touchscreen as well as corresponding information displayed on the device may be adjusted and/or varied from one application to another and/or within a respective application. In this way, a common physical architecture of the device may support a variety of applications with user interfaces that are intuitive and transparent.

Figure 1:
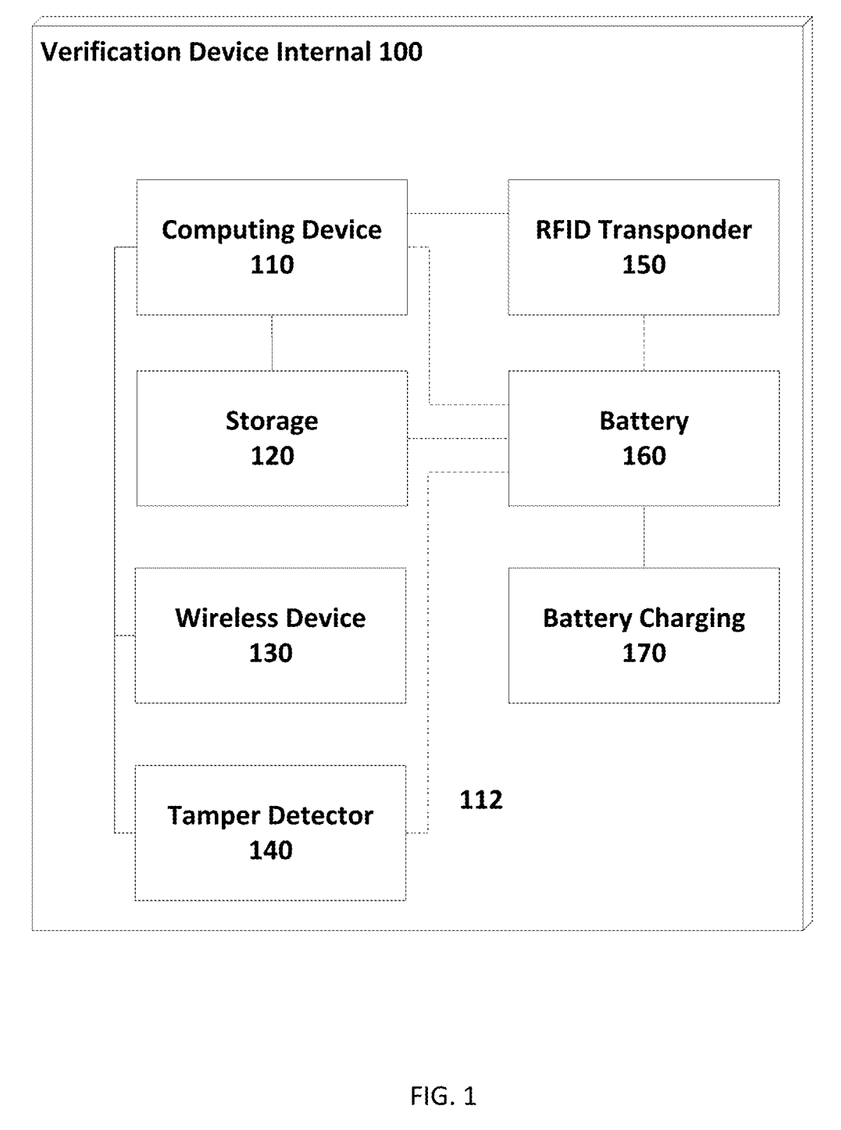
FIG. 1 illustrates a verification device according to an example embodiment of the present invention.

FIG. 1 illustrates a verification device 100 according to an example embodiment of the present invention. Verification device 100 includes computing device 110, bus device 112, storage 120, wireless device 130, tamper detector 140, RFID transponder 150, battery 160, and battery charging component 170. Verification device 100 may comprise a portable communication device or may be integrated into other electrical components of the vehicle, such as a vehicle's infotainment system, an in-vehicle camera, and/or other in-vehicle biometric scanner.

Within a vehicle, and at a border crossing, verification device 100 enables unsupervised or automatic biometric authentication of subjects (i.e., persons or travelers) moving between secured areas (e.g., across a border or into a secured facility, for example). Verification device 100 is configured to store reference biometric information for one or more vehicle occupants. Upon approaching a verification station at a border crossing, user(s) (e.g., traveler(s)) supply one or more biometrics (e.g., fingerprint, facial, voice) for validation against the reference biometric information. Upon validation, verification device 100 transmits a validated signal to the verification station to enable the vehicle to pass the border crossing without stopping at the immigration booth. For example, the receipt of a validated signal may trigger the opening of a gate at a border crossing. If verification device 100 cannot validate the user's biometric against the reference biometric information, the verification device may transmit a not-validated signal to the verification station, and the user proceeds to stop at the immigration booth.

As shown in FIG. 1, verification device 100 may include a bus device 112 and/or other communication mechanism(s) configured to communicate information between the various components of verification device 100, such as computing device 110 and storage 120. In addition, wireless device 130 may enable connectivity between computing device 110 and other devices by encoding data sent from computing device 110 to another device over a network and decoding data received from another system over the network for computing device 110. In the various embodiments, verification device 100 may comprise a portable communication device that includes a tamper-proof, battery-powered device.

Wireless device 130 may include a network interface card that is configured to provide wireless network communications. A variety of wireless communication techniques may be used including infrared, Bluetooth, Wi-Fi, and/or cellular communications. Alternatively, or additionally, wireless device 130 may be or include a communication device configured to provide wired network connection(s), such as an Ethernet connection.

RFID Transponder 150 uses radio-frequency identification having one or more electromagnetic fields to communicate identity and biometric information for one or more vehicle occupants. For example, the validated signal and the not-validated signal may be transmitted by RFID transponder and/or wireless device 130. Verification device 100 may include an active RFID transponder 150 that is unlockable via a fingerprint biometric to interact with an RFID reader and a verification system (e.g., verification reader 415 of verification station 400 of FIG. 4). The validated signal or not validated signal may include a unique code that identifies verification device 100 and optionally other data. In some configurations, a smart card form factor may be used as RFID transponder 150 to enable a smaller transponder unit.

Computing device 110 may comprise one or more general or specific purpose processors to perform computation and control functions of verification device 100. Computing device 110 may include a single integrated circuit, such as a micro-processing device, or may include multiple integrated circuit devices and/or circuit boards working in cooperation to accomplish the functions of computing device 110. In addition, computing device 110 may execute computer programs, such as an operating system 115, biometric validation modules, and other applications stored within storage 120.

Verification device 100 may include storage 120 for storing reference biometric information as well as other information and instructions for execution by computing device 110. For example, storage 120 may be configured to store registered biometric templates that include reference biometric information. Storage 120 may store software modules that provide functionality when executed by computing device 110. The modules may include an operating system that provides operating system functionality for verification device 100. The modules can include biometric validation modules configured to identify occupants of the vehicle.

Non-transitory storage 120 may include a variety of computer-readable medium that may be accessed by computing device 110. For example, storage 120 may include any combination of random access memory ("RAM"), dynamic RAM ("DRAM"), static RAM ("SRAM"), read only memory ("ROM"), flash memory, cache memory, and/or any other type of non-transitory computer-readable medium.

Although shown as a single system, the functionality of verification device 100 may be implemented as a distributed system. For example, storage 120 and computing device 110 may be distributed across multiple different computers that collectively comprise verification device 100. In one embodiment, verification device 100 may be part of a device (e.g., a mobile phone or tablet), and verification device 100 may provide manipulation of the vehicle's infotainment system. In other examples, verification device 100 may comprise or be communicatively coupled to a windshield-mounted tag or communicatively coupled to a tag mounted on a vehicle license plate.

Figure 2:
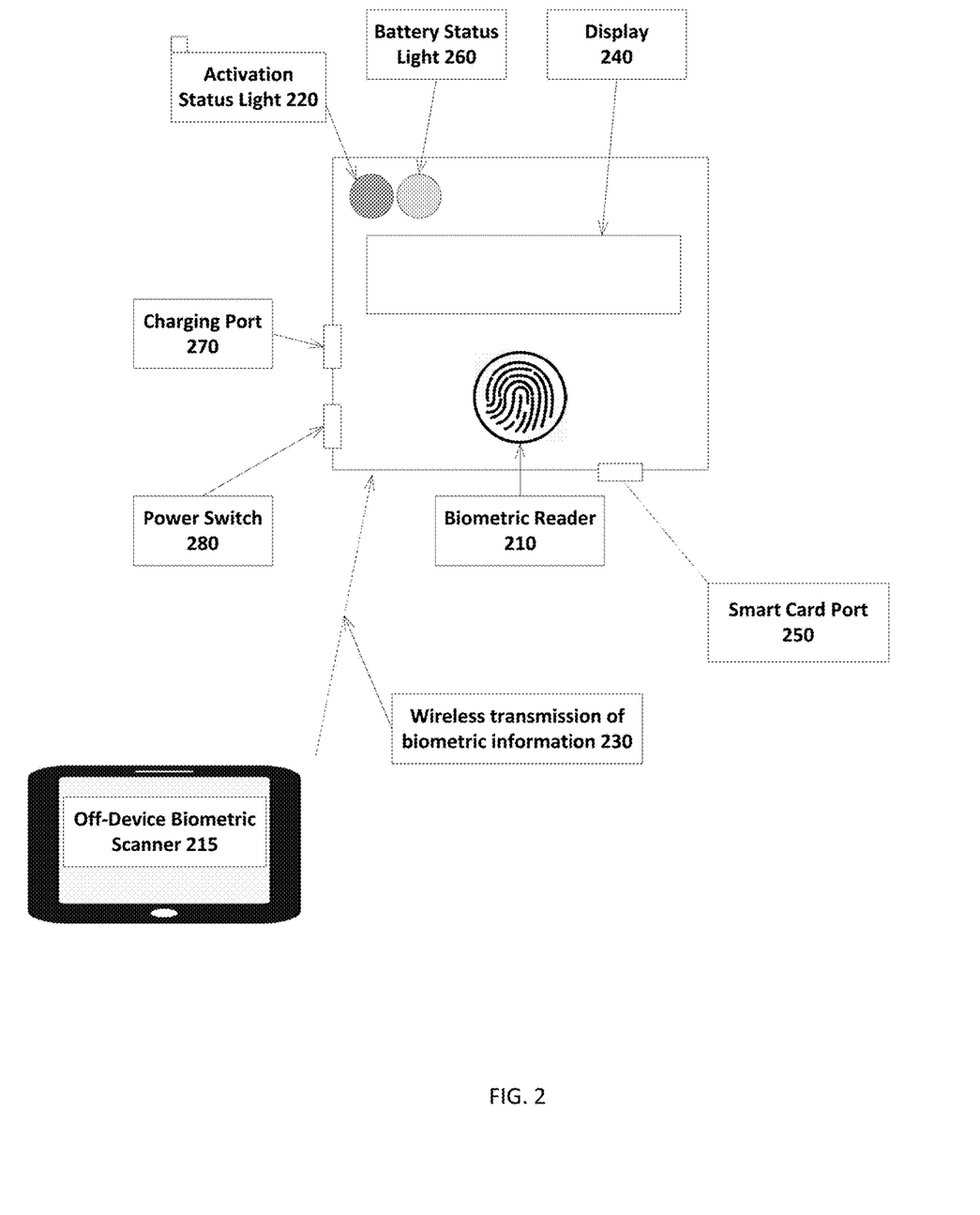
FIG. 2 illustrates a plurality of user-interfaces for the verification device according to an example embodiment of the present invention.

Computing device 110 is further coupled via bus 112 to a display (such as display 240 as shown in FIG. 2), such as a Liquid Crystal Display ("LCD"). Other input devices such as a keypad, fingerprint scanner, or other biometric scanner (s) also may be included in verification device 100.

Tamper detector 140 is used to ensure that reference biometric information that is used to validate the user's identity is not compromised, and/or that the devices and software used to determine the validated/not-validated status are not compromised. Tamper detector may use checksums, digital signatures, and/or other validation mechanisms to detect whether reference biometric information has been tampered with. For example, if an unauthorized user attempts to manipulate the validation device 100, the correct checksum would not be preserved rendering the verification device 100 inoperable. Verification device 100 may delete reference biometric information in response to the detection of a tampering event. In addition, verification device 100 may communicate that tampering has occurred to a registration station and/or verification station.

The functionality disclosed herein may be implemented on separate servers (e.g., registration station, registration server, or verification station) or devices that may be commutatively coupled together. Other such devices may include additional modules, such as registration modules, registration database(s), and verification modules. Further, one or more component of verification device 100 may not be included. For example, for functionality of a user client, verification device 100 may be coupled to a vehicle infotainment system, in-vehicle camera, and/or other in-vehicle biometric scanner that includes a processor, memory, and a display, but may not include one or more of the other components shown in FIG. 1.

FIG. 2 illustrates a plurality of user-interfaces for verification device 100 according to an example embodiment of the present invention.

As shown in FIG. 2, verification device 100 further includes biometric scanner 210 (e.g., fingerprint scanner) and off-device biometric scanner 215 (e.g., one or more mobile phones, vehicle infotainment system, in-vehicle camera, in-vehicle biometric scanner, etc.). Biometric information collected at off-device biometric scanner 215 may be wirelessly communicated to verification device 100 via wireless transmission of biometric information 230. Smart card port 250 may be configured to upload registered reference biometric information to verification device 100.

Activation light 220 and/or display 240 may be configured to indicate the status of verification device 100. For example, a green light may denote that verification device 100 has validated the user's biometric against the reference biometric information, and/or that verification device 100 has transmitted a validated signal to the verification station to enable the vehicle to pass the border crossing without stopping at the immigration booth. By contrast, a red light may denote that verification device 100 cannot validate the user's biometric against the reference biometric information, and/or that the verification device has transmitted a not-validated signal to the verification station. Here, display 240 may direct the user to stop at the immigration booth. In another example, activation light 220 indicates the device activation state.

Verification device 100 further includes a variety of other components, such as battery status light 260, charging port 270, and power switch 280. Charging port 270 includes one or more mechanisms for charging battery 160 through a cable and/or by induction. Battery status light 260 may turn red if the device battery is low, for example.

Figure 3:
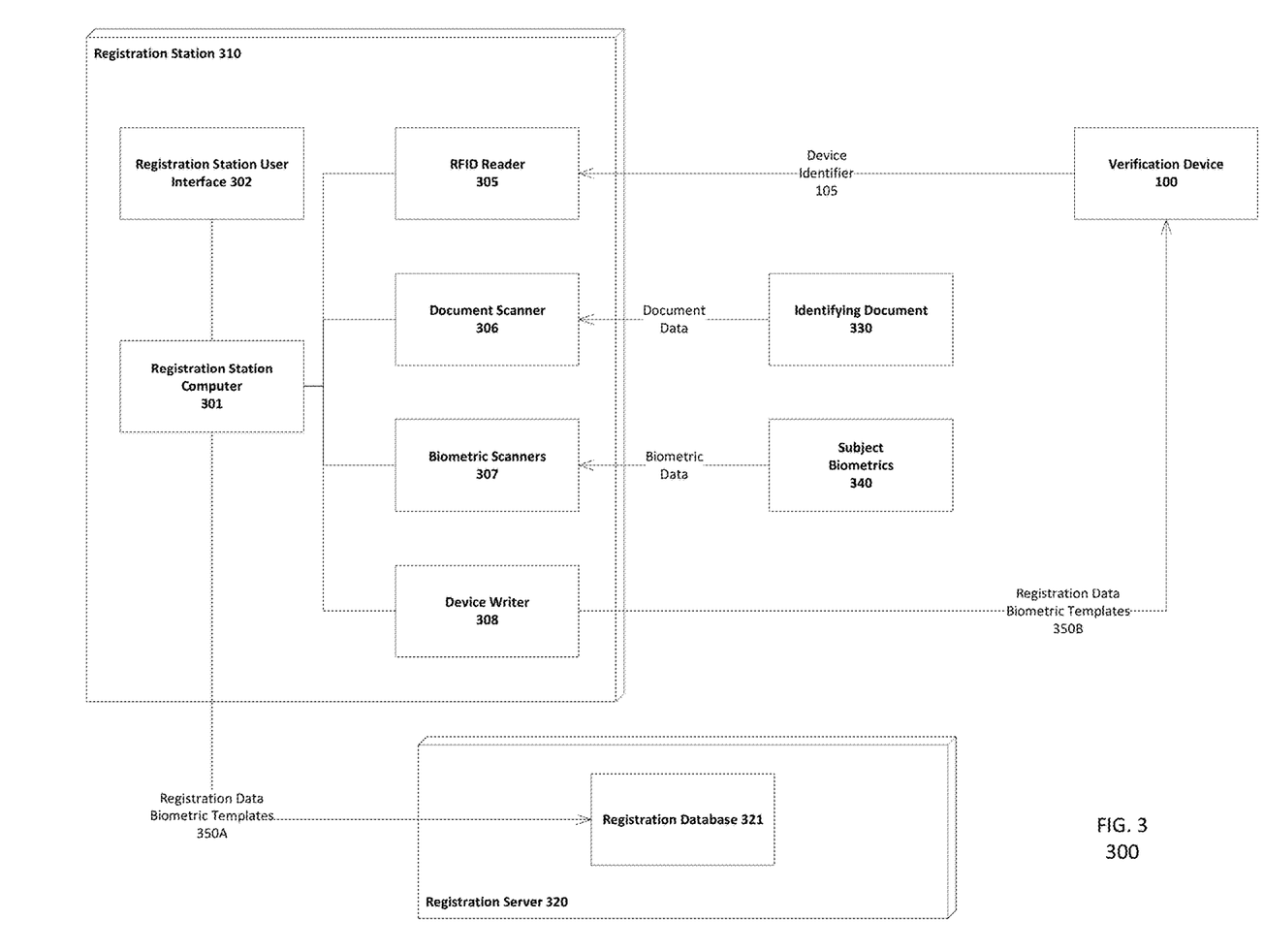
FIG. 3 illustrates a registration system according to an example embodiment of the present invention.

FIG. 3 illustrates a registration system 300 according to an example embodiment of the present invention. As shown in FIG. 3, registration system 300 includes verification device 100 (as described in connection with FIG. 1 and FIG. 2), registration station 310, and registration server 320.

Registration station 310 comprises a computer 301 having a plurality of user-interfaces 302. For example, registration station 310 may include input/output devices such as a display (e.g., a touchscreen), keyboard, mouse, etc. In addition, registration station 310 includes RFID reader 305, document scanner 306, biometric scanner(s) 307, and device writer 308.

To initiate the registration process using registration system 300, verification device 100 transmits device identifier 110. Next, RFID reader 305 receives device identifier 105 at RFID reader 305. In conjunction with the receipt of device identifier 105, document scanner 306 receives document data for identifying document 330 (e.g., a passport, visa, driver's license, etc.), and biometric scanner(s) 307 receives one or more biometrics 340 (e.g., fingerprint, facial pattern, vocal pattern) of the user, or for each respective user. Device identifier 105 is then associated with the received document data and the received biometric data (e.g., collectively, registration data and biometric template(s) 350A). Subsequently, device writer 308 transmits the associated data or the reference biometric information for storage at verification device 308. Alternatively, a smart card (e.g., an integrated circuit (IC) card) using smart card port 250 may be configured to upload the associated data (e.g., collectively, registration data and biometric template(s) 350A) or reference biometric information to verification device 100. In addition, or optionally, registration station 310 transmits the associated data (e.g., collectively, registration data and biometric template(s) 350B) to registration server 320 for storage at registration database 321.

A registration method according to an example embodiment of the present invention is described. At the outset, a subject registers at a registration station. The registration is determined according to one or more rules implemented by the registering authority. In response, the registering authority generates a registration for the subject. Next, the subject presents one or more identification documents to the registering authority, such as a driver license or a passport. Upon receipt of the one or more identification documents, the registering authority optionally scans and stores the identification documents using the document scanner.

Figure 4:
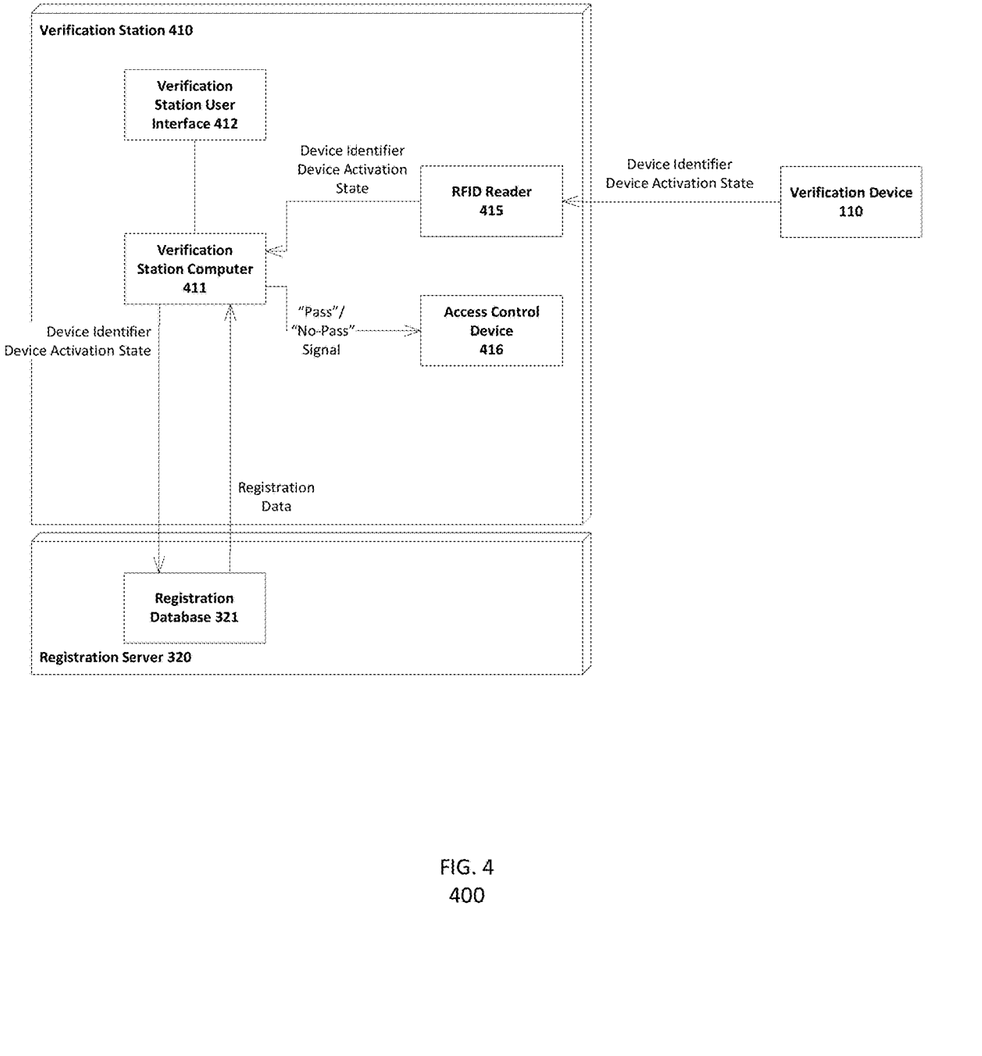
FIG. 4 illustrates a verification system according to an example embodiment of the present invention.

Subsequently, the registering authority collects biometric(s) from the subject using the biometric scanner (e.g., a fingerprint, facial, voice), that generates the associated biometric template(s). In turn, the registering authority scans an unregistered or previously registered but expired verification device using the RFID reader and links it to the registration. Here, the registering authority uses the device writer to write one or more selected biometric templates to the verification device, and to write registration information to the device, which may include identification document information and/or vehicle identification information (e.g., make, model, year, license plate no, owner name, etc.). Identifying data of the vehicle and vehicle occupant(s) may be displayed at the display of registration station 310 or by the border control officer at the display verification station 410. The registering authority has the subject test the verification device by scanning their fingerprint or other biometric on the verification device then using the RFID reader on the registration station to verify the device is functioning.

Thus, registration station 310 enables a registering authority to verify the identity of one or more users (e.g., travelers), and to program verification device 110 under controlled and supervised conditions and circumstances.

FIG. 4 illustrates a verification system 400 according to an example embodiment of the present invention. As shown in FIG. 4, verification system 400 includes verification device 100 (as described in connection with FIG. 1 and FIG. 2), registration server 320, and verification station 410. Verification station includes computer 411, one or more user interfaces 412, RFID reader 415, access control device(s) 416 (e.g., a gate, turn-spike, etc.).

At the outset, a vehicle having verification device 100 approaches verification station 410. Upon approach, the subject uses an available biometric scanner to read their biometrics to attempt to activate the verification device 100. The verification device 100 transmits a validated or not-validated signal to verification station 410. At verification station 410, RFID reader 415 receives the validated or not-validated signal from verification device 100. For example, if verification device 100 has validated the user's biometric against the reference biometric information, and verification device 100 has transmitted a validated signal to verification station 410, computer 411 may instruct that a pass signal is transmitted to access control device 416 to enable the vehicle to pass the border crossing without stopping at the immigration booth.

Alternatively, computer 411 may optionally confirm registration of verification device 100, using the device identifier and device activation state, against registration data stored in registration database 321 of registration server 320 and optionally stored on the verification device 100. Upon confirmation of the validated signal, including a device identifier and device activation state, computer 411 instructs that a pass signal is transmitted to access control device 416 to enable the vehicle to pass the border crossing without stopping at the immigration booth. Without confirmation of the validated signal, the user is instructed to proceed to an immigration booth.

By contrast, if verification device 100 cannot validate the user's biometric against the reference biometric information, and verification device 100 has transmitted a not-validated signal to verification station 410, computer 411 instructs that a no-pass signal is transmitted to access control device 416 such that the user proceeds to stop at the immigration booth as a fail signal is sent to access control device 416.

A validation method according to an example embodiment of the present invention is described. At the outset, the subject approaches a control point with a verification station, such as a border crossing. Here, the subject scans their fingerprint on the verification device. In some example configurations, the tamper detection component is interrogated to determine if the device has been tampered with. If so, the device will fail to activate and the activation status light will turn red. If the device has not been tampered with, the scanned biometric is converted to a biometric template and compared with the template(s) stored on the device. If it matches one of the templates, the device activates and the activation status light will turn green. Otherwise the activation status light turns orange. Subsequently, the subject presents the verification device to the reader on the verification station. If the device is activated, the RFID transponder code is sent along with the desired action by the verification station. If the device is not activated, nothing will happen, and the subject will not be enabled to pass through the verification station.

Figure 5:
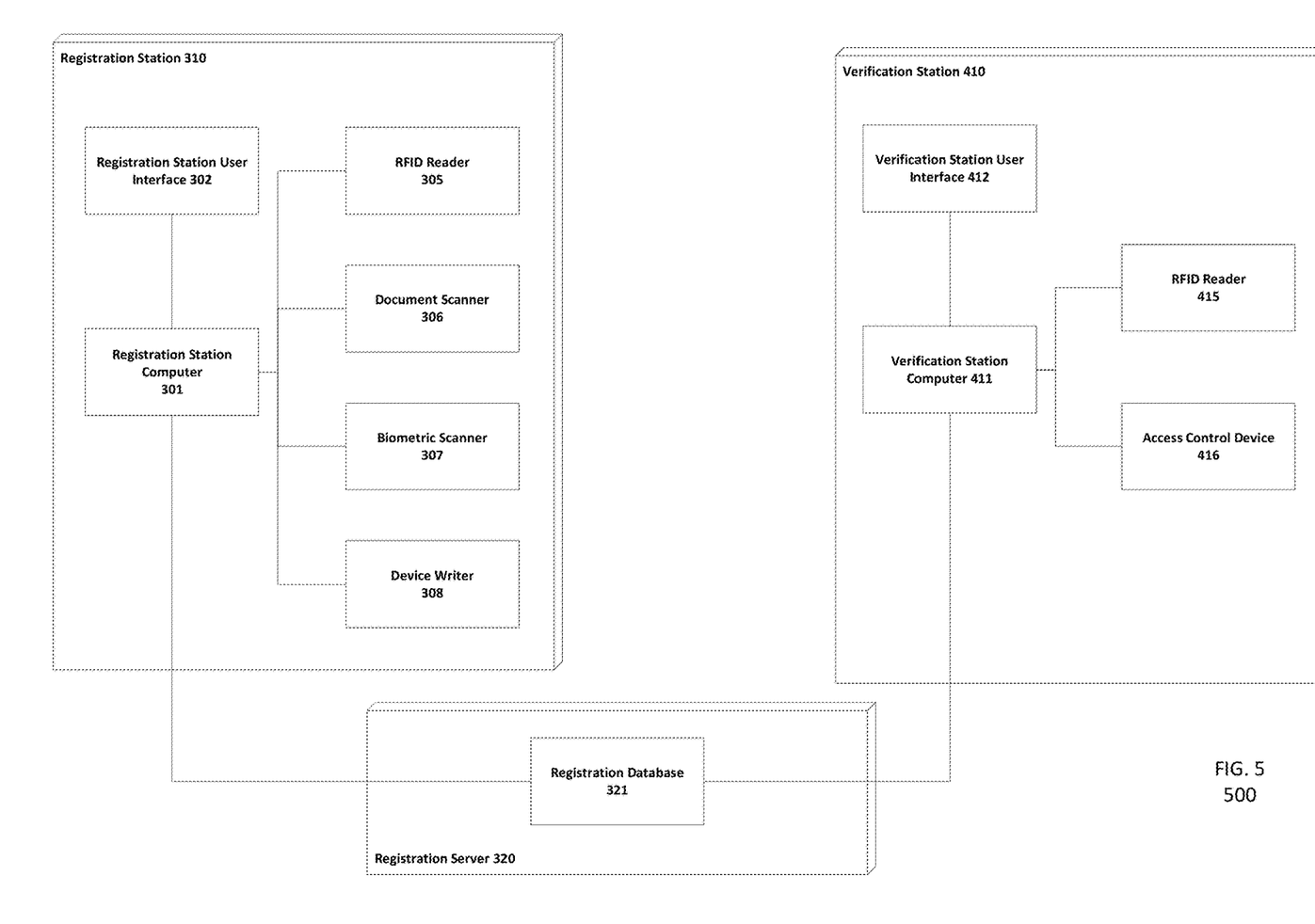
FIG. 5 illustrates a network diagram according to an example embodiment of the present invention.

A verification station that is configured to read an activated Verification Device and display information associated with the subject from one or more connected external databases and optionally from the verification device to the authority;

FIG. 5 illustrates a network diagram 500 according to an example embodiment of the present invention. As shown in FIG. 5, network diagram 500 includes registration station 310, registration server 320, and verification station 410. Each of registration station 310, registration server 320, and verification station 410 may be communicatively coupled by a network, such as Ethernet. Alternatively, and as shown, each of registration station 310 and verification station 410 may be communicatively coupled by a network to registration server 320.

As described above, the embodiments of the present invention provide in-vehicle biometric verification. The embodiments may be implemented as a tamper-resistant and battery-powered RFID transponder that includes an integrated or communicatively coupled biometric scanner (e.g., a fingerprint scanner, facial pattern, vocal pattern, etc.). In response to the reading and matching of one or more biometrics, the transponder becomes active and emits a validated signal, such as a validated code.

For example, the code of the transponder may be linked to the user's information through a verification system. Additionally, or alternatively, the device also may include information (e.g., the tampering status of the device, the expiration status of the registration, the license plate number, encryption/decryption keys, etc.) in a local memory or a remotely-accessible storage that may be accessible along with the code while the device is active. The device becomes inactive once conditions are met (e.g., after a predetermined period of time has elapsed since successful biometric scanning, or the device enters or leaves a particular geographic area, not in proximity to a border crossing for example).

Currently, known RFID transponders are used in connection with electronic toll passes. Such known RFID transponders may be pre-registered by the traveler and the transponder code read when the vehicle approaches a toll. However, known RFID transponders do not verify that the traveler presenting a particular transponder is actually the person registered to the particular transponder.

Accordingly, the embodiments of the present invention expand upon the use of RFID transponders by introducing verification using biometrics. In the various embodiments, another person may not activate the RFID transponder of a different traveler. In other words, each traveler is individually identified in connection with a particular RFID transponder.

Although some example configurations are described, it should be readily understood by one of ordinary skill in the art the numerous other configurations are feasible with the scope of the invention. For example, the device may be implemented as a windshield-mounted tag for single-occupant vehicles. In another example, the device may be implemented as a smart card. In yet another example, Face Recognition and/or other biometrics may be used. In yet another example still, a cell phone or other device may be configured to collect the data of each of the occupants of the vehicle through an application and validated against the transponder. In any of the various configurations, activation/deactivation may be determined according to the GPS-determined location of the device.

It will be apparent to those skilled in the art that various modifications and variations may be made in the in-vehicle biometric collection and verification systems and methods of the present invention without departing from the spirit or scope of the invention. Thus, it is intended that the present invention cover the modifications and variations of this invention provided they come within the scope of the appended claims and their equivalents.

We claim:

1. A computer-implemented method for registering a verification device, the method comprising:
   receiving, at an RFID reader of a registration station, a device identifier;
   receiving, at a document scanner of the registration station, document data for an identifying document;
   receiving, at a biometric scanner of the registration station, biometric data of a user;

receiving, at the registration station, identifying data of a vehicle;

associating, at the registration station, the document data and the biometric data with the device identifier;

transmitting the associated data to the verification device and to a registration server; and determining, at the verification device, whether to enable a vehicle to pass a border crossing without stopping at an immigration booth, wherein an activation light is configured to indicate status of the verification device, a green light denoting that the verification device has validated the user's biometric data against reference biometric information, and that verification device has transmitted a validated signal to a verification station to enable the vehicle to pass the border crossing without stopping at the immigration booth, a red light denoting that the verification device cannot validate the user's biometric data against reference biometric information, and that the verification device has transmitted a not-validated signal to the verification station such that a display directs the user to stop at the immigration booth.

2. The computer implemented method according to claim 1, wherein the biometric data includes at least one of a fingerprint, facial pattern, and vocal pattern.

3. The computer implemented method according to claim 1, wherein the associated data is transmitted to a verification device using a smart card.

4. The computer implemented method according to claim 1, wherein the identifying document is a passport.

5. A registration station for registering a verification device, the registration station comprising:

a processor;

a storage memory coupled to the processor, the processor configured to:

receive, at an RFID reader, a device identifier;

receive, at a document scanner, document data for an identifying document;

receive, at a biometric scanner, biometric data of a user;

receiving, at the registration station, identifying data of a vehicle;

associate the document data and the biometric data with the device identifier;

transmit the associated data to the verification device; and determine, at the verification device, whether to enable a vehicle to pass a border crossing without stopping at an immigration booth, wherein an activation light is configured to indicate status of the verification device, a green light denoting that the verification device has validated the user's biometric data against reference biometric information, and that verification device has transmitted a validated signal to a verification station to enable the vehicle to pass the border crossing without stopping at the immigration booth, a red light denoting that the verification device cannot validate the user's biometric data against reference biometric information, and that the verification device has transmitted a not-validated signal to the verification station such that a display directs the user to stop at the immigration booth.

6. The registration station according to claim 5, wherein the biometric data includes at least one of a fingerprint, facial pattern, and vocal pattern.

7. The registration station according to claim 5, wherein the associated data is transmitted to a verification device using a smart card.

8. The registration station according to claim 5, wherein the identifying document is a passport.

9. The registration station according to claim 5, wherein the identifying document is a driver's license or travel visa.

10. A computer-implemented method for validating a verification device, the method comprising:

receiving, at RFID reader, a validated or not-validated signal from verification device;

if a validated signal is received, instructing that a pass signal is transmitted to an access control device to enable a vehicle to pass a border crossing without stopping at an immigration booth; and if a not-validated signal is received, instructing that a no-pass signal is transmitted to the access control device such that the vehicle is directed to the immigration booth, wherein an activation light is configured to indicate status of the verification device, a green light denoting that the verification device has validated the user's biometric data against reference biometric information, and that verification device has transmitted a validated signal to a verification station to enable the vehicle to pass the border crossing without stopping at the immigration booth, a red light denoting that the verification device cannot validate the user's biometric data against reference biometric information, and that the verification device has transmitted a not-validated signal to the verification station such that a display directs the user to stop at the immigration booth.

11. The computer implemented method according to claim 10, a validated signal is received if a verification device has validated a user's biometric data against reference biometric information.

12. The computer implemented method according to claim 11, wherein the biometric data includes at least one of a fingerprint, facial pattern, and vocal pattern.

13. The computer implemented method according to claim 10, a not-validated signal is received if a verification device cannot validate a user's biometric against reference biometric information.

14. The computer implemented method according to claim 10, further comprising confirming registration of a verification device against registration data stored in a registration database of a registration server.

15. A verification station for validating a verification device, the validation station comprising:

a processor; and a storage memory coupled to the processor, the processor configured to:

receive, at RFID reader, a validated or not-validated signal from a verification device;

if a validated signal is received, instructing that a pass signal is transmitted to an access control device to enable a vehicle to pass a border crossing without stopping at an immigration booth; and if a not-validated signal is received, instructing that a no-pass signal is transmitted to the access control device such that the vehicle is directed to the immigration booth, wherein an activation light is configured to indicate status of the verification device, a green light denoting that the verification device has validated the user's biometric data against reference biometric information, and that verification device has transmitted a validated signal to the verification station to enable the vehicle to pass the border crossing without stopping at the immigration booth, a red light denoting that the verification device cannot validate the user's biometric data against reference biometric information, and that the verification device has transmitted a not-validated signal to the verification station such that a display directs the user to stop at the immigration booth.

16. The verification station according to claim 15, a validated signal is received if a verification device has validated a user's biometric data against reference biometric information.

17. The verification station according to claim 16, wherein the biometric data includes at least one of a fingerprint, facial pattern, and vocal pattern.

18. The verification station according to claim 15, wherein a not-validated signal is received if a verification device cannot validate a user's biometric against reference biometric information.

19. The verification station according to claim 15, further comprising confirming registration of a verification device against registration data stored in a registration database of a registration server.

20. A computer-implemented method for operating a verification device, the method comprising:

receiving, at an in-vehicle biometric scanner, biometric data for a user;

comparing, at a processor, the biometric data against reference biometric data;

if the biometric data matches the reference biometric data, generating a validated signal, and if the biometric data does not match the reference biometric data, generating a not-validated signal; and transmitting, at an RFID transponder, the validated signal or the not-validated signal to a verification station located at a border crossing to enable a vehicle to pass a border crossing without stopping at an immigration booth, wherein an activation light is configured to indicate status of the verification device, a green light denoting that the verification device has validated the user's biometric data against reference biometric information, and that verification device has transmitted a validated signal to a verification station to enable the vehicle to pass the border crossing without stopping at the immigration booth, a red light denoting that the verification device cannot validate the user's biometric data against reference biometric information, and that the verification device has transmitted a not-validated signal to the verification station such that a display directs the user to stop at the immigration booth.

* * * * *